United States Patent
Seuret et al.

(10) Patent No.: US 6,820,651 B2
(45) Date of Patent: Nov. 23, 2004

(54) ELECTRICALLY ACTUATED VALVE

(75) Inventors: Christophe Seuret, La Chaux-de-Fonds (CH); Lionel Gandin, Geneva (CH)

(73) Assignee: Fluid Automation Systems S.A., Versoix (CH)

( * ) Notice: Subject to any disclaimer, the term of this patent is extended or adjusted under 35 U.S.C. 154(b) by 0 days.

(21) Appl. No.: 10/376,635

(22) Filed: Mar. 3, 2003

(65) Prior Publication Data

US 2003/0183289 A1 Oct. 2, 2003

(30) Foreign Application Priority Data

Mar. 28, 2002 (EP) .............................................. 02007103

(51) Int. Cl.[7] .............................................. F15B 13/044
(52) U.S. Cl. .............................. 137/625.65; 137/596.17; 251/129.16; 251/129.17
(58) Field of Search ....................... 137/596.17, 625.65; 251/129.16, 129.17

(56) References Cited

U.S. PATENT DOCUMENTS

| | | | | |
|---|---|---|---|---|
| 3,921,670 A | * | 11/1975 | Clippard et al. | 137/625.65 |
| 4,253,493 A | * | 3/1981 | English | 137/625.65 |
| 4,320,781 A | | 3/1982 | Bouvet et al. | |
| 4,753,416 A | * | 6/1988 | Inagaki et al. | 137/625.65 |
| 4,922,965 A | * | 5/1990 | Meister | 137/625.65 |
| 5,924,674 A | | 7/1999 | Hahn et al. | |

FOREIGN PATENT DOCUMENTS

| EP | 0 939 258 A1 | 9/1999 |
|---|---|---|
| GB | 1 559 836 | 1/1980 |
| JP | A 60-256691 | 12/1985 |

* cited by examiner

Primary Examiner—Gerald A. Michalsky
(74) Attorney, Agent, or Firm—Young & Thompson

(57) ABSTRACT

An electrically actuated valve includes firstly a fixed core (1) accommodating, at least, one coil (2) in, at least, one housing and forming therewith, at least, one electromagnet of the electrically actuated valve. Further, this valve includes a body (4) forming with the fixed core (1) the sealingly tight carrier structure of the electrically actuated valve. Thirdly, this valve includes, at least, one movable core (3) placed between the fixed core (1) and the body (4). This electrically actuated valve is specially innovative in that the fixed core (1) is made as an unitary part from an injected ferromagnetic material and in that it combines several functions, in particular that of the pneumatic connection and/or of the electrical connection of the coil/coils (2). The decrease in the number of parts and the simplification of the design allow, accordingly, an additional miniaturization.

15 Claims, 5 Drawing Sheets

Fig.1a
Fig.1b
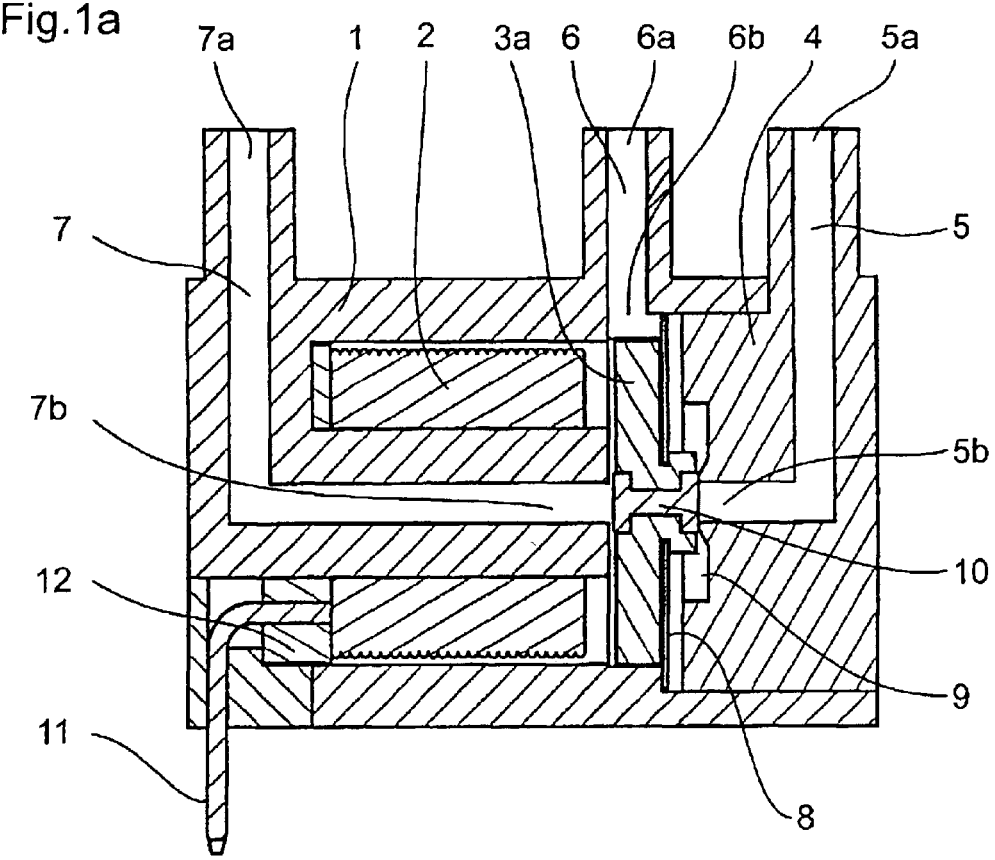
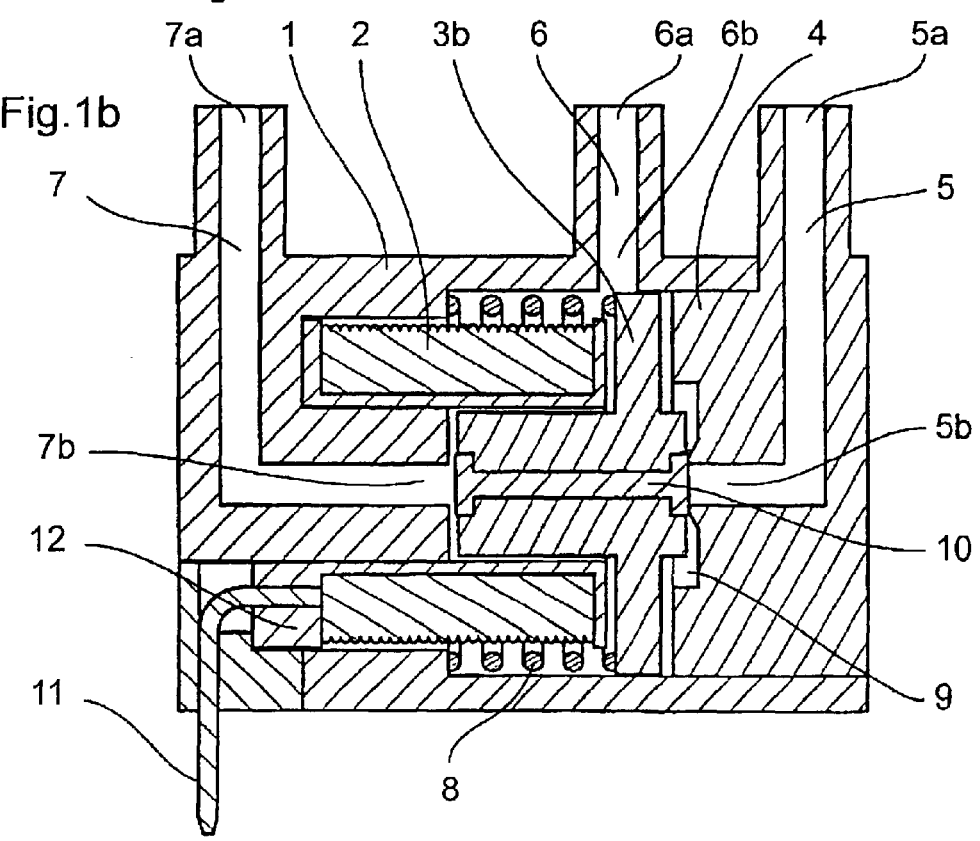

ELECTRICALLY ACTUATED VALVE

The present invention is concerned with electrically actuated valves. In principle, these valves are capable of controlling, via an electromagnetic mechanism, the application of a pressure at a precise location and/or of controlling the passage of a fluid or of a gas, by opening and or closing an orifice which controls the discharge of the fluid or of the gas. In some uses of the electrically actuated valves, it is desirable to miniaturise them.

The main parts of a conventional electrically actuated valve are an electromagnet, which is generally comprised of a fixed core and of a coil, of a movable core and of a carrier structure. Depending on the assemblage constraints, the use envisaged or any other reason, one can generally add to these main parts numerous other parts designed for specific purposes.

Furthermore, in the presently known electrically actuated valves, these three parts are comprised of several separate components. This situation is mainly a consequence of the manufacturing methods used for the ferromagnetic parts, as for example, conventional stamping or machining and it constitutes a significant drawback when miniaturising electrically actuated valves in the sense that a simple decrease in the size of the parts, without a parallel decrease in the number of parts does not provide a solution to many of the assemblage problems. The latter become often insurmountable when the size of the parts decreases and this imposes limitations on the miniaturisation.

The cylindrical shape of known electrically actuated valves and, mainly the cylindrical shape of the movable core of conventional electrically actuated valve constitute a further major drawback, and because this geometry is not optimal from the standpoint of the contact surface between the fixed core and the movable core, the magnetic force is not optimum, when considering the size of the valve.

An electrically actuated valve necessitates both electrical and pneumatic connections. This leads to undesirable complications in the design, the assembling and the functioning, specially in the case of inter-valve connections conventionally obtained by connecting the pressure admission or discharge of the electrically actuated valves, through a pneumatic base which then also becomes complicated in its design.

The purpose of the present invention is to remedy the above-mentioned drawbacks and to provide an electrically actuated valve comprised of a minimal number of parts, through the application of an injection technology to ferromagnetic metals, for the manufacture of complex multifunctional parts, having preferably a rectangular shape in order to optimise the contact surface between the fixed core and the movable core of the electrically actuated valve, with the central part thus incorporating, at least, one part of the pneumatic and/or of the electrical connections. These advantages contribute to advances in the miniaturisation of the electrically actuated valves and to a simplification of the assemblage.

Accordingly, the object of the present invention is an electrically actuated valve which has the characteristic features set forth in claim 1 and/or in the dependent claims.

The appended drawings represent, by way of example, several embodiments of the invention.

FIGS. 1a, 1b and 1c illustrate, schematically, the principle of an electrically actuated valve having an electromagnet with a flat plunger or an electromagnet with a plunger piston, a common orifice being provided in a fixed core or in a body.

Figure 5A:
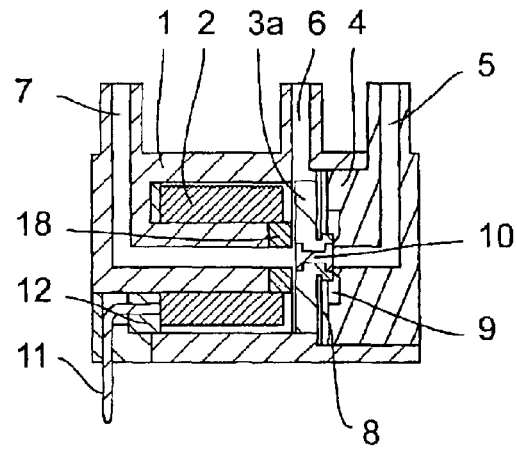
Figure 5B:
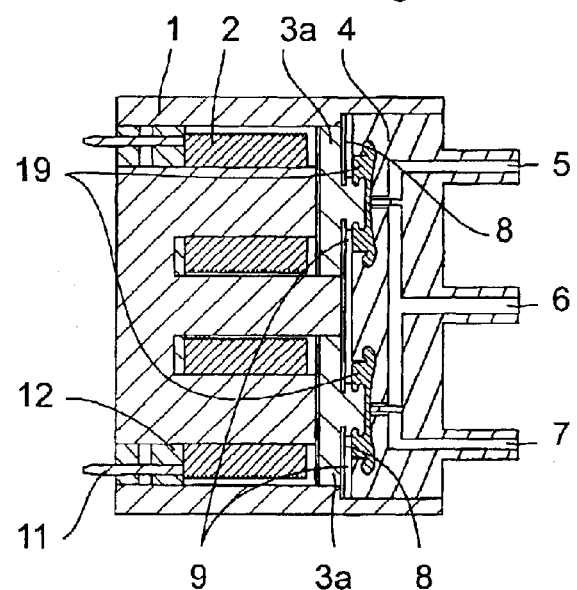
Figure 5C:
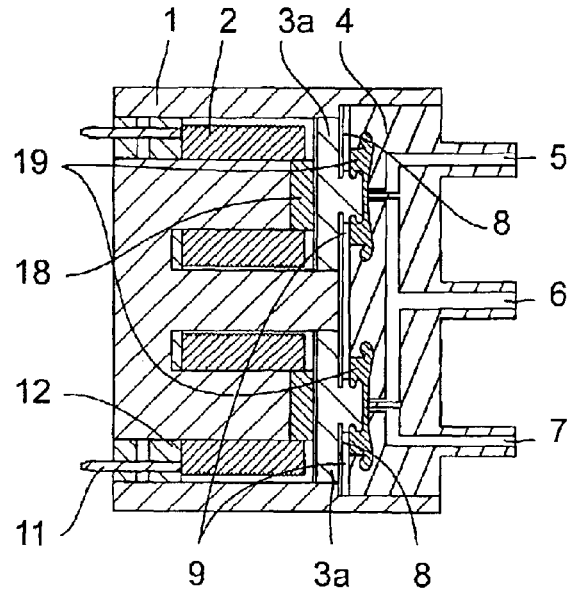

FIGS. 5a–c illustrate, schematically, several other embodiments of a three-way electrically actuated valve.

FIGS. 6a–d illustrate, schematically, different embodiments of a two-way electrically actuated valve.

The invention will now be described in detail, with reference to the appended drawings, which illustrate by way of example, several embodiments of the invention.

The electromagnetic valve, illustrated in FIG. 1a, is a three-way electrically actuated valve with two positions, which can function in a three-way mode normally open, in a three-way mode normally closed or in a selector or distributor mode, simply by changing the positions of the pressure admission and the pressure discharge connector.

Figure 1C:
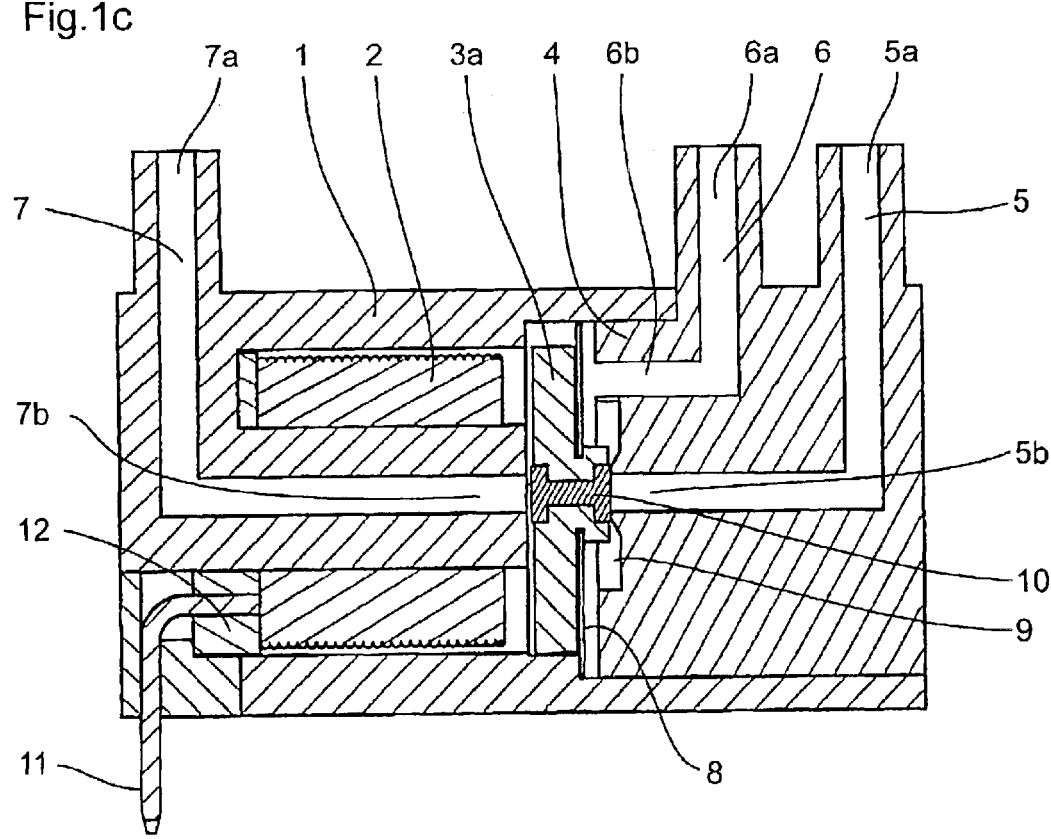

The electrically actuated valve is comprised of these major parts, namely a fixed core 1 made as a unitary part accommodating a coil 2 in a corresponding housing, a movable core 3, and a body 4. The fixed core 1 and the body 4 form the sealingly tight support structure of the electrically actuated valve, the fixed core 1 and the coil 2 form together the electromagnet. The movable core 3 can be designed as a flat plunger 3a, as illustrated in FIGS. 1a and 1c, or as a plunger piston 3b, as in FIG. 1b.

The plunger is positioned concentrically with respect to the axis of the electrically actuated valve in a chamber 9, between the fixed core 1 and the body 4, facing the coil 2. The pressure supply passage 5 and the discharge passage 7 are partly on the axis of the valve, the central part of the plunger 3 being then designed as a shutter, to close alternately the inner admission orifice 5b or the inner discharge orifice 7b which have the shape of a nozzle. To this end, an elastomer 10 is over-moulded, either as a single part or as two parts, at the centre of the plunger. Furthermore, a return spring 8 is installed in the chamber 9 between the fixed core 1 and the body 4. This spring can be helical or flat and it maintains the plunger in a first position, in which the inner admission orifice 5b is closed and the inner discharge orifice 7b is open. When the electromagnet is subjected to a voltage, the plunger assumes, against the urge of this spring, its second position in which the inner admission orifice 5b is open and the inner discharge orifice 7b is closed, which makes it possible to create a pressure at the common outer orifice 6a. When the voltage is cancelled, the return spring brings the plunger 3 back to its first position enabling a gas or a fluid to escape via the discharge passage 7 and thus to cancel the pressure at the common outer orifice 6a. An inversion of the pressure admission and of pressure discharge connectors makes it possible to use the valve in modes of operation referred to as <<normally closed>> and <<normally open>>. The pressure admission connector at the common outer orifice 6a makes it possible to use the electrically actuated valve in the <<selector>> mode; the connection of two pressure admissions on the outer admission orifice 5a and on the outer discharge orifice 7a is referred to as the <<distribution>> mode.

The plunger 3, the return spring 8 and their housing, as well as the electrically actuated valve as a whole, can have a rectangular or an oval shape. This geometry increases the contact surface between the plunger 3 and the fixed core 1 of the electromagnet and, accordingly, the magnetic force, which makes it possible to decrease accordingly the width of the electrically actuated valve. In this case, a flat return spring 8 should only be held by its two ends, and accordingly exhibit a lower return force as well as lower internal strains than a circular construction.

The fixed core 1 is made using a technology for obtaining unitary parts based on the injection of a ferromagnetic material. This technique consists in injecting a mixture of a metal powder and of a plastic binder, then in de-alloying and sintering the part obtained. The part is injected to have a size above that required, so that in the subsequent sintering it reverts to the expected dimensions. The fixed core obtained in this manner as a unitary part, enables it to assume several functions.

Firstly, this unitary part fulfils the function of a fixed core and of a magnetic circuit for the electromagnet, with the material and the manufacturing process ensuring the magnetic characteristics required. It has an annular groove accommodating the coil 2.

Secondly, this part is designed in such a manner as to incorporate passages for the pneumatic and electrical connections of the electrically actuated valve. It can, as illustrated in FIG. 1a or 1b, include a pressure discharge passage 7 with an outer discharge orifice 7a and an inner discharge orifice 7b, as well as a common passage 6 with the common outer orifice 6a and the common inner orifice 6b. It can further include, as in FIG. 1c, only the discharge passage 7 with the corresponding orifices. The body 4, normally made of plastic, includes in these cases, either only a pressure admission passage 5 with the outer admission orifice 5a and the inner admission orifice 5b or the admission passage 5 and the common passage 6 with the corresponding orifices. The inner admission orifice 5b exhibits a nozzle facing the centre of a movable core 3 and the inner discharge orifice 7b has a nozzle facing the centre of the other side of the movable core 3.

This unitary part can also include only inner passages without the protruding parts shown in FIGS. 1a–c, or the protruding parts of the passages can be made from separate parts designed for being integrated through corresponding orifices and provided to this end in the movable core.

In general, the design of the electrically actuated valve allows several different pneumatic outlays. The outer orifices can be aligned or located on any face of the valve; it is possible, in particular, to position the outer discharge orifice 7a perpendicularly or parallelly with respect to the axis of the valve, to position the three outer orifices 5a, 6a, 7a in the same plane or, further, to position the outer discharge orifice 7a and the outer admission orifice 5a in the same plane, the common outer orifice 6a being perpendicular to this plane. This can be accompanied by a corresponding arrangement of the passage for the electrical connection, such as the incorporation of a centralised electrical connection 14 in the same plane, as described in detail later in this document.

In substance, the injection technique for ferromagnetic metals which is used, makes it possible to manufacture the fixed core 1 as a unitary part, even including the protruding orifices (7a, 6a), as is illustrated in FIGS. 1a, 1b and 1c or simply aligned with the outer surface of the electrically actuated valve, an annular groove for accommodating the coil and other characteristics described hereafter.

Figure 2A:
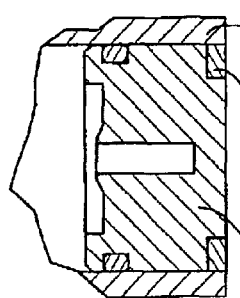
FIGS. 2a, 2b and 2c illustrate examples of the assemblage of an electrically actuated valve through the use of an adhesive, staples or clips.
Figure 2B:
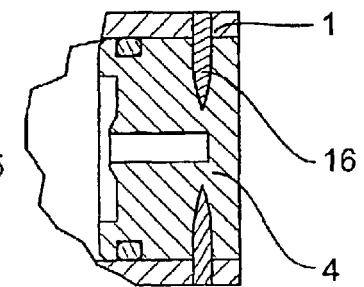
Figure 2C:
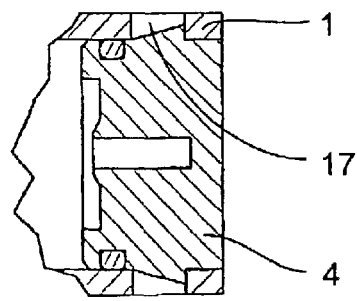

Thirdly, this unitary fixed core part 1 is designed in such a manner as to enable the final assemblage of the electrically actuated valve from the fixed core 1 and the body 4. To this end, said part has a geometrical shape which allows said assembling, either through bonding, for example by a resin joint 15 placed in a groove of the body 4 and adhering chemically to the metal of the fixed core 1, or through the introduction of pins or staples 16, or by fastening with clips 17, as illustrated in FIGS. 2a–2c.

Fourthly, this unitary part, as well as the body 4, can exhibit lugs 13, supports or orifices designed for ensuring the inter-valve fastening or the fastening of the electrically actuated valve on a pneumatic base 20.

Figure 3:
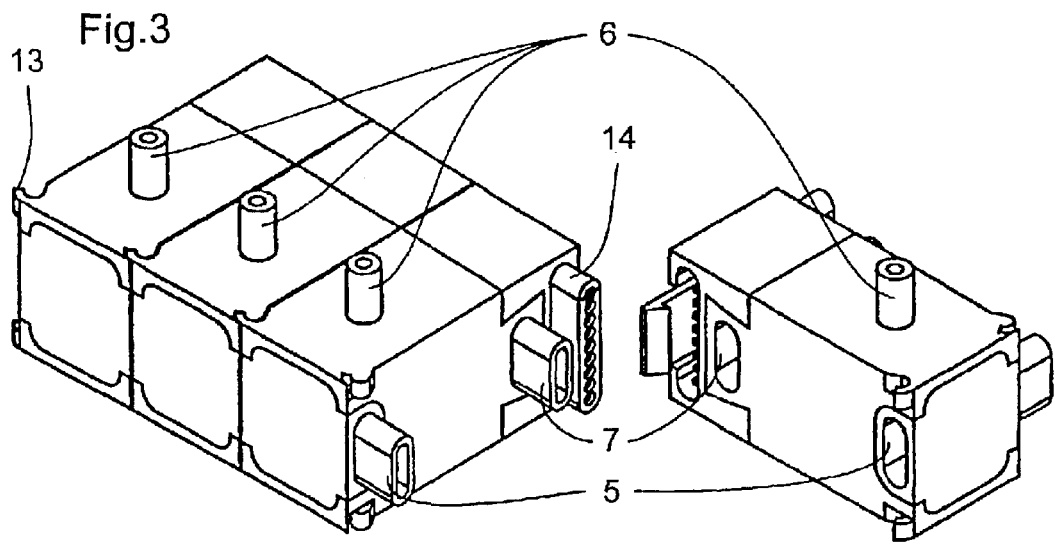
FIG. 3 shows an example of a pneumatic and of an electrical connection, standardised and centralised in order to simplify the inter-valve connections.

As was mentioned above, the pressure admission and discharge orifices can be arranged differently. Accordingly, it is possible, as illustrated in FIG. 3, to design a pneumatic and an electrical connection which makes it possible to provide a direct connection between the electrically actuated valves, of the pressure admissions and/or discharges. This is possible—if the pressure admission passage 5 and the pressure discharge passage 7 include each one two standardised outer orifices on the two opposite sides of the electrically actuated valve—by positioning in a plane the outer admission orifices 5a and the outer discharge orifices 7a, as well as, when desired, the centralised electrical connection 14, with the common outer orifice being positioned perpendicularly thereto. The assembling of several valves then ensures the complete pneumatic and electrical connection of the assembly. This arrangement makes it possible, in particular, to simplify the electrical connection of a group of interconnected electrically actuated valves, owing to the fact that the connectors 14 are standardised and accommodated in the body 4 while extending through the same parallelly with respect to the pneumatic orifices designed to be interconnected and to be controlled from an electrically actuated valve which accommodates centrally the outer electrical connections.

Figure 4A:
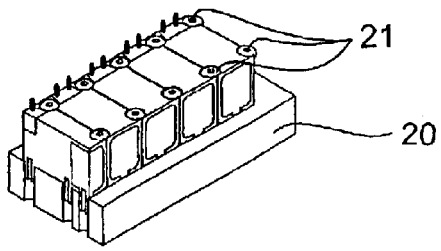
FIGS. 4a to 4f illustrate, schematically, different methods for fastening an electrically actuated valve to a pneumatic base.
Figure 4B:
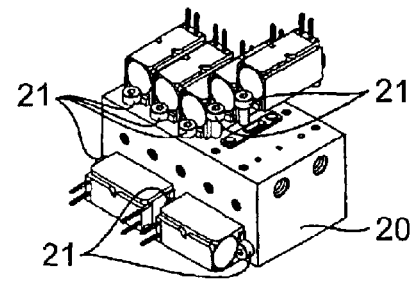
Figure 4C:
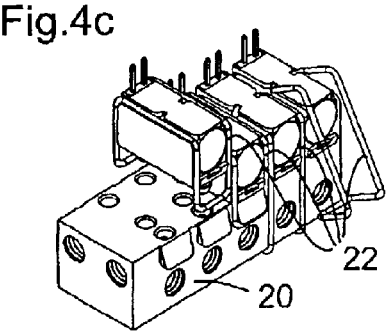
Figure 4D:
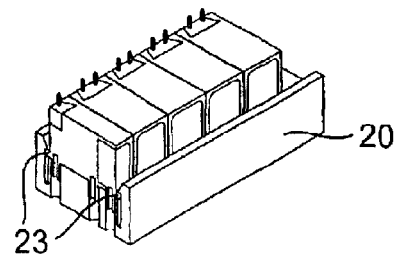
Figure 4E:
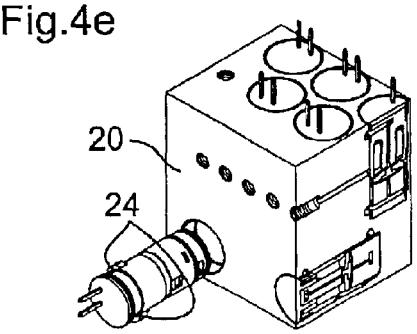
Figure 4F:
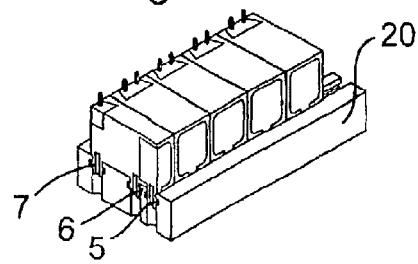

Such an arrangement also simplifies the fastening on a pneumatic base 20 by eliminating, when desired, the need that the base fulfils the function of an electrical and/or of a pneumatic connector. In these cases, the rectangular shape of the valves is particularly interesting from the mechanical standpoint for the assemblage of the valve. As illustrated schematically in FIGS. 4a to 4f, the fastening on a base is made possible, amongst others, by the different types of fastening means illustrated such as a fastening using screws 21 (FIGS. 4a and 4b), clips 22 (FIG. 4c), rails 23 (FIG. 4d), bayonet systems 24, which are obviously interesting for valves having the cylindrical shape as shown in FIG. 4e, or further by using pneumatic couplers (FIG. 4f). The fact of having at one's disposal fixed core arrangements of complex geometric forms which are adapted for an inter-valve connection or for a connection onto a base, while being formed as unitary units is, therefore, particularly advantageous.

The electrical connection of the solenoid divulged in this document encompasses several systems. In one embodiment of the electrical connection, two spurs 11, which are placed above the core 12 of the coil 2 and to which are fixed the wires of the coil to extend through the fixed core 1 via an orifice closed sealingly after their installation, are used directly as external connectors. These spurs 11 can be straight or curved after the introduction of the coil 2 into its housing. The spurs can also act as the male members of a connector or they can be welded to an outer electronic board.

The description above and the drawings shown, which relate to a three-way electrically actuated valve with two positions, are clearly not limiting and other versions of an electrically actuated valve, according to the present invention, are possible. Several other embodiments of an electrically actuated valve, which have the protected characteristic features of the present document, will be described hereafter.

Firstly, when considering the tree-way valves with two positions, FIG. 5a illustrates an embodiment of an electrically actuated valve, which further includes a permanent magnet 18 having the shape of a ring placed concentrically with respect to the axis of the valve in the central part of the fixed core 1. Depending on the magnetic characteristics of the ferromagnetic material used for the manufacture of the fixed core 1, this permanent magnet 18, after its magnetisation, acts to increase the magnetic force generated by the core.

Secondly, FIG. 5b shows an electromagnetic valve with a different pneumatic outlay. In this case, the unitary part forming the fixed core 1 functions as a magnetic circuit, as a housing for the coil 2, it provides the passages for the electrical connection and the fastening means for the assembling of the valve and for the inter-valve connection as described above. However, the pneumatic passages are exclusively located in the body 4. This makes it possible to place the outer orifices (5a, 6a, 7a) of all the pneumatic passages, for example parallelly with respect to the axis of the valve on the outwards facing free side of the body 4. In this case, the fixed core 1 is provided with two coils 2 accommodated in two annular grooves. Two corresponding mobile cores 3 are placed in a manner similar to that described above, in two chambers 9, between the fixed core 1 and the body 4, to close or open, independently, the inner orifices 5b and 7d of the pressure admission passage 5 and of the pressure discharge passage 7, which are located facing the movable cores as well as, simultaneously, one of the two common inner orifices 6b opening laterally with respect to the orifices 5b or 7b. Contrary to the case of FIG. 5a, where the inner discharge orifice 7b has—with respect to the inner admission orifice 5b—a nozzle facing the other side of the movable core 3, the inner discharge orifice 7b has, in the case of FIG. 5b, a nozzle on the same side, but however, facing the second movable core 3. A deformable separation membrane 19 is incorporated into the movable cores 3 and is also fastened to the body 4, to prevent the inflow of fluid or of gas in the part of the valve on the side of membrane facing the movable cores 3. Such a design makes possible a spatial separation of the pneumatic and of the electromagnetic functions of the valve. In another example (not illustrated), in which all the pneumatic passages are located in the body 4, the outer orifices are oriented, at least partly, perpendicularly with respect to the axis of the valve, for example by extending the body 4 to this end beyond its part designed for being housed in the fixed core 1 and, should the need arise, to make these passages extend through the entire body 4. This type of design of the pneumatic passages, located only in the body 4, facilitates, amongst others, the inter-valve connecting.

Thirdly, it is obviously possible to include, as illustrated in FIG. 5c, two permanent magnets 18, which here have the shape of a disk and in a manner corresponding to what was described above, in the fixed core 1 of an electrically actuated three way valve, the three passages being situated on the outwardly facing side of the body 4.

The characteristics of the invention are not limited to electrically actuated three way valves, but can be applied to other similar valves. In particular, it is possible to adapt the embodiments described above to electrically actuated two way valves. This will be explained in detail hereafter, with reference to FIGS. 6a–d, which correspond to FIGS. 1a and 5a–c relating to three way valves.

Figure 6A:
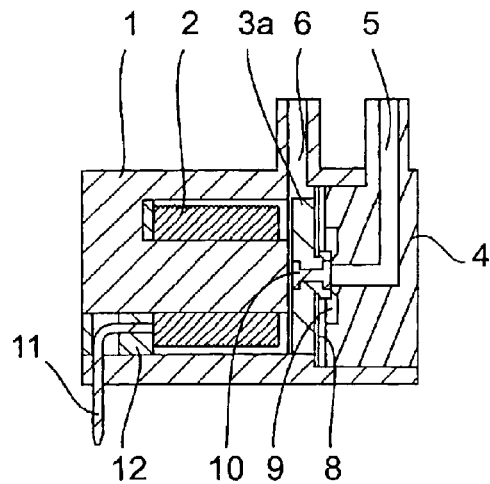

FIG. 6a shows an electrically actuated two way valve with two positions, including a pressure admission passage 5 located in the body and a common passage 6, which is used here as the pressure discharge passage. The functions, the parts and the design of the valve are analogous to what was explained in relation with the description of FIGS. 1a–c, except for the fact that the fixed core 1 does not include a third pneumatic passage. This movable core 3 can make it possible to open or close the inner admission orifice 5b, thus allowing or preventing the passage of a fluid or of a gas through the common discharge passage 6. This mode of positioning the pneumatic passages can also be achieved by a construction (not illustrated), in which two passages are arranged axially in the valve, contrary to the version of FIG. 6a, in which the outer orifices 5a, 6a and, above all, the common passage 6, are arranged perpendicularly with respect to the axis of the valve, instead of being parallel with respect to this axis. This arrangement is also applicable in a similar manner to three way valves, wherein, at least, two passages can be positioned axially or parallelly with respect to the axis of the valve. Other possibilities for arranging and orienting the pneumatic passages can further be imagined, in order to optimise the geometry of the valve for certain applications, for ensuring the inter-valve connection or the fastening on a base. The fact that they will not be elaborated upon, does not, however, limit the scope of the present invention.

Figure 6B:
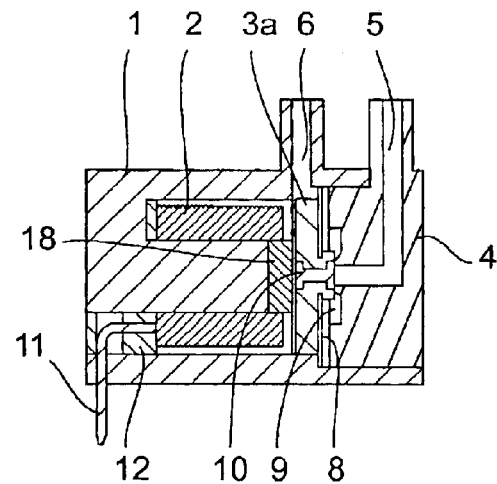

Clearly and as illustrated in FIG. 6b, this type of electrically actuated valve can be equipped with a permanent magnet 18 having the shape of a disk which is placed concentrically with respect to the axis of the valve, in the central part of the fixed core 1.

Figure 6C:
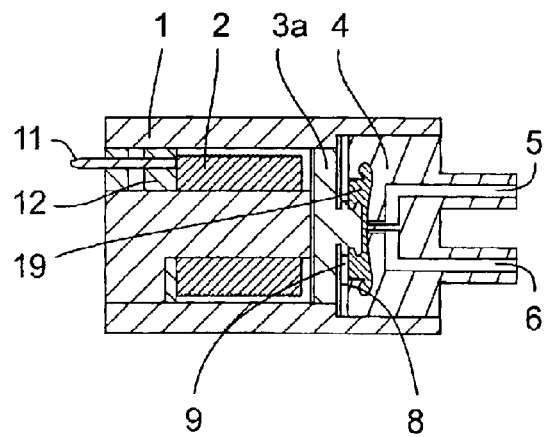

The embodiment with a pneumatic outlay arranged in such a manner that all the pneumatic orifices be located on the outward facing side of the body 4 is also possible, and is illustrated schematically in FIG. 6c in the case of two way valves. Such a valve includes a separation membrane 19 which is deformable and which is fixed between the movable core 3 and the body 4, so as to ensure a sealingly tight separation between the fixed core 1 accommodating the electromagnet and the body 4 accommodating the pneumatic system.

Figure 6D:
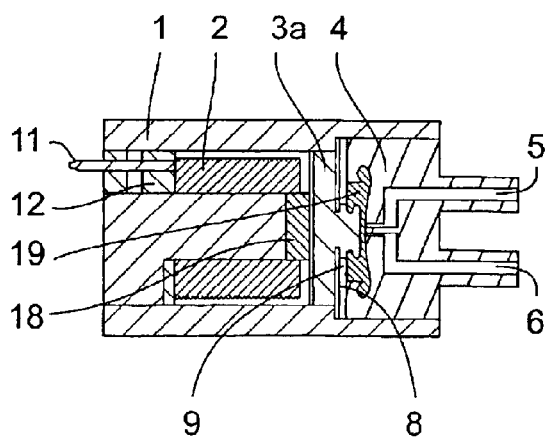

Clearly, this embodiment of an electrically actuated valve can be modified, as illustrated in FIG. 6d, by placing a permanent magnet 18 into the central part of the fixed core.

Quite obviously, the comments made and the explanations given in the case of the three way valves and concerning the shape of the valve (which can be rectangular or oval when assembled) and also the disposition of the pneumatic passages, of the plunger, of the return spring or of the housings, also apply in the case of two way valves, and vice versa. Accordingly, the characteristic features of the unitary part forming the fixed core 1 relating to the final assemblage of the valve from the fixed core 1 and from the body 4, to the inter-valve fastening and/or to the mounting on a base, as well as those concerning the electrical connection, can be adapted correspondingly.

This description of different embodiments of an electromagnetic valve according to the invention is neither exhaustive nor complete. One can obviously design the movable core 3 as a plunger piston instead of being a flat plunger 3a, as illustrated in FIGS. 5a–c and 6a–d and, when the valves have a cylindrical shape, ensure their mechanical connection by a conventional system, for example a cartridge or a self-tapping connection, or make other conventional modifications which are compatible with the invention described, without however limiting the scope of the present invention.

What is claimed is:

1. An electrically actuated valve, comprising:
   a fixed core (1) accommodating at least one coil (2) in at least one housing and forming therewith at least one electromagnet;

a body (4) forming with the fixed core (1) a carrier structure;

at least one movable core (3) placed between the fixed core (1) and the body (4) and movable between two service positions, wherein the fixed core (1) is designed as an unitary part made by injection from a ferromagnetic material, constitutes a magnetic circuit of the electromagnet/electromagnets and incorporates at least one of pneumatic and electrical connections;

a pressure admission passage (5) with an outer admission orifice (5a) and an inner admission orifice (5b), the pressure admission passage being located in the body (4); and a common passage (6) with a common outer oritice (6a) and at least one common inner orifice (6b), the common passage being located either in the unitary part forming the fixed core (1) or in the body (4), in such a manner as to enable the common passage to communicate with other passages either directly or indirectly through the chamber (9) between the fixed core (1) and the body (4).

2. An electrically actuated valve according to claim 1, further comprising:

a pressure discharge passage (7) with an outer discharge orifice (7a) and an inner discharge orifice (7b), the pressure discharge passage being located in one of the unitary part forming the fixed core (1) and in the body (4).

3. An electrically actuated valve according to claim 2, wherein the outer discharge orifice (7a) of the pressure discharge passage (7) is positioned perpendicularly or parallelly with respect to the axis of the valve.

4. An electrically actuated valve according to claim 2, wherein the pressure admission passage (5) and the pressure discharge passage (7) provide a pneumatic inter-valve connection, owing to each of the pressure admission and discharge passages including two standardized outer orifices on two opposite sides of the valve.

5. An electrically actuated valve according to claim 1, wherein at least two of the outer orifices (5a, 6a, 7a) are located in the same plane.

6. An electrically actuated valve according to claim 1, wherein all the outer orifices (5a, 6a, 7a) are parallel with respect to the axis of the valve and are placed on the free side of the body (4) facing outwards.

7. An electrically actuated valve according to claim 1, wherein at least one of the outer orifices (5a, 6a, 7a) forms a passage protruding from the valve.

8. An electrically actuated valve according to claim 1, wherein the movable core (3) and a corresponding housing formed by the chamber (9) between the fixed core (1) and the body (4) facing the coil (2) or the entire electrically actuated valve have a shape which increases a contact surface between the movable core (3) and the fixed core (1) to optimise the magnetic force.

9. An electrically actuated valve according to claim 1, further comprising at least one permanent magnet (18) having a shape of a disk or a ring and placed concentrically or parallelly with respect to the axis of the valve in a central part of the fixed core (1) surrounded by the coil (2).

10. An electrically actuated valve according to claim 1, wherein the unitary part forming the fixed core (1) is arranged in such a manner as to allow a final assembling of the valve from the fixed core (1) and the body (4), enabling a sealingly tight fastening of the fixed core with the body owing to respective geometrical shapes of the fixed core and body.

11. An electrically actuated valve according to claim 10, wherein the unitary part forming the fixed core (1) comprises, on a side oriented towards the body (4), a peripheral section sensibly forming a receptacle and being adapted to receive the movable core (3) as well as the body (4) in an inside circumference, the peripheral section allowing direct magnetic flux transmission to the movable core and securing the body (4) to the unitary part.

12. An electrically actuated valve according to claim 10, wherein the fastening of the fixed core (1) to the body (4) includes at least one of an adhesive, pins, clips (17), and staples (16) extending through the body (4) and the part forming the fixed core.

13. An electrically actuated valve according to claim 1, wherein the electrical connection of a group of interconnected electrically actuated valves is incorporated into the body (4) via a standardized connector (14) extending through the body, centralizing an electrical control of a whole group of electrically actuated valves on a single electrically actuated valve.

14. An electrically actuated valve according to claim 1, wherein at least one of the unitary part forming the fixed core (1) and the body (4) includes lugs (13), supports or orifices for the inter-valve fastening or fastening of the electrically actuated valve on a pneumatic base (20).

15. An electrically actuated valve according to claim 14, wherein the inter-valve fastening or the fastening on the pneumatic base (20) includes at least one of screws (21), clips (22), rails (23), bayonet systems (24), and pneumatic connectors.

* * * * *